United States Patent
Thomas

(10) Patent No.: US 7,513,931 B2
(45) Date of Patent: Apr. 7, 2009

(54) PROCESS FOR RECOVERING PLATINUM GROUP METALS, RHENIUM AND GOLD

(75) Inventor: Joseph L. Thomas, Yorba Linda, CA (US)

(73) Assignee: Metals Recovery Technology Inc., Anaheim, CA (US)

(*) Notice: Subject to any disclaimer, the term of this patent is extended or adjusted under 35 U.S.C. 154(b) by 0 days.

(21) Appl. No.: 11/871,102

(22) Filed: Oct. 11, 2007

(65) Prior Publication Data

US 2008/0110296 A1 May 15, 2008

Related U.S. Application Data

(63) Continuation of application No. PCT/US2006/013708, filed on Apr. 12, 2006.

(60) Provisional application No. 60/671,260, filed on Apr. 13, 2005.

(51) Int. Cl.
C22B 11/00 (2006.01)
C22B 11/06 (2006.01)

(52) U.S. Cl. .................................. 75/723; 210/681

(58) Field of Classification Search .............. 75/723; 210/681
See application file for complete search history.

(56) References Cited

U.S. PATENT DOCUMENTS

| | | | |
|---|---|---|---|
| 4,623,522 A | 11/1986 | Rickelton | 423/22 |
| 4,980,134 A | 12/1990 | Butler | 423/27 |
| 5,120,443 A * | 6/1992 | Bruening et al. | 210/638 |
| 5,238,662 A | 8/1993 | Dubrovsky | 423/22 |
| 7,163,570 B2 * | 1/2007 | Grant | 75/711 |
| 2004/0118249 A1 * | 6/2004 | Asano et al. | 75/722 |

OTHER PUBLICATIONS

"Anabolicminds Archive: Beginners Guide to Soxhlet Extractions." Submitted Apr. 2003. Downloaded May 21, 2008 from http://www.erowid.org/archive/rhodium/pdf/soxhlet4dummies.pdf.*

(Continued)

Primary Examiner—Roy King
Assistant Examiner—Tima M McGuthry-Banks
(74) Attorney, Agent, or Firm—Connolly Bove Lodge & Hutz LLP

(57) ABSTRACT

Processing for the extraction of metals consisting of platinum, palladium, iridium, rhodium, osmium, ruthenium, rhenium and gold (PGMRA) includes dissolution of the PGMRA metals from solid materials in an acidic aqueous solution, preferably with a halogen acid sparged with the corresponding halogen element. The acidic solution is then exposed to extraction material of non-cross-linked polyamine composite resin. The bound metal, following washing of the extraction material is eluted from the resin using stronger acidic processes than that provided in the wash of the resin. Conventional extraction by organic solvents or other known techniques is employed to recover the PGMRA metals. Rhodium is separated from the rest of the PGMRA metals either near the beginning or the end of the process. Rhodium is separated by creating hydroxides with the metals in the solution and then reacidifying the metals such that the rhodium remains as aquochlororhodate complexes. Using the binding process to the extraction material leaves only the aquochlororhodate complexes in solution to be recovered. All of the PGMRA metals may be recovered by conventional means such as organic solvents, reduction or precipitation.

6 Claims, 9 Drawing Sheets

Schematic diagram of process without extraction of Rhodium

OTHER PUBLICATIONS

M.S. Alam et al., *Hydrometallurgy* 49 (1998), pp. 213-227, Cover & pp. 720, 721.

*Metals Handbook*, Desk Edition, Second Edition, J.R. Davis, ASM International, 1998, pp. 213-227.

C. Anderson, E. Rosenberg, C. K. Hart, L. Ratz, Y. Cao "Single Step Separation and Recovery of Palladium Using Nitrogen Species Catalyzed Pressure Leaching and Silica Polyamine Composites," *Proceedings of the 5th International Symposium on Hydrometallurgy*, 2003, vol. 1 Leaching and Purification, Ed. Courtney Young, TMS, Warendale, PA, p. 393 (12 pgs.).

Purity Systems Inc. document(s) made available at the International Precious Metals Institute annual meeting regarding Platinum Group Metals, Gold and Transition Metals during the second week of Jun. 2005. (5 pgs.).

* cited by examiner

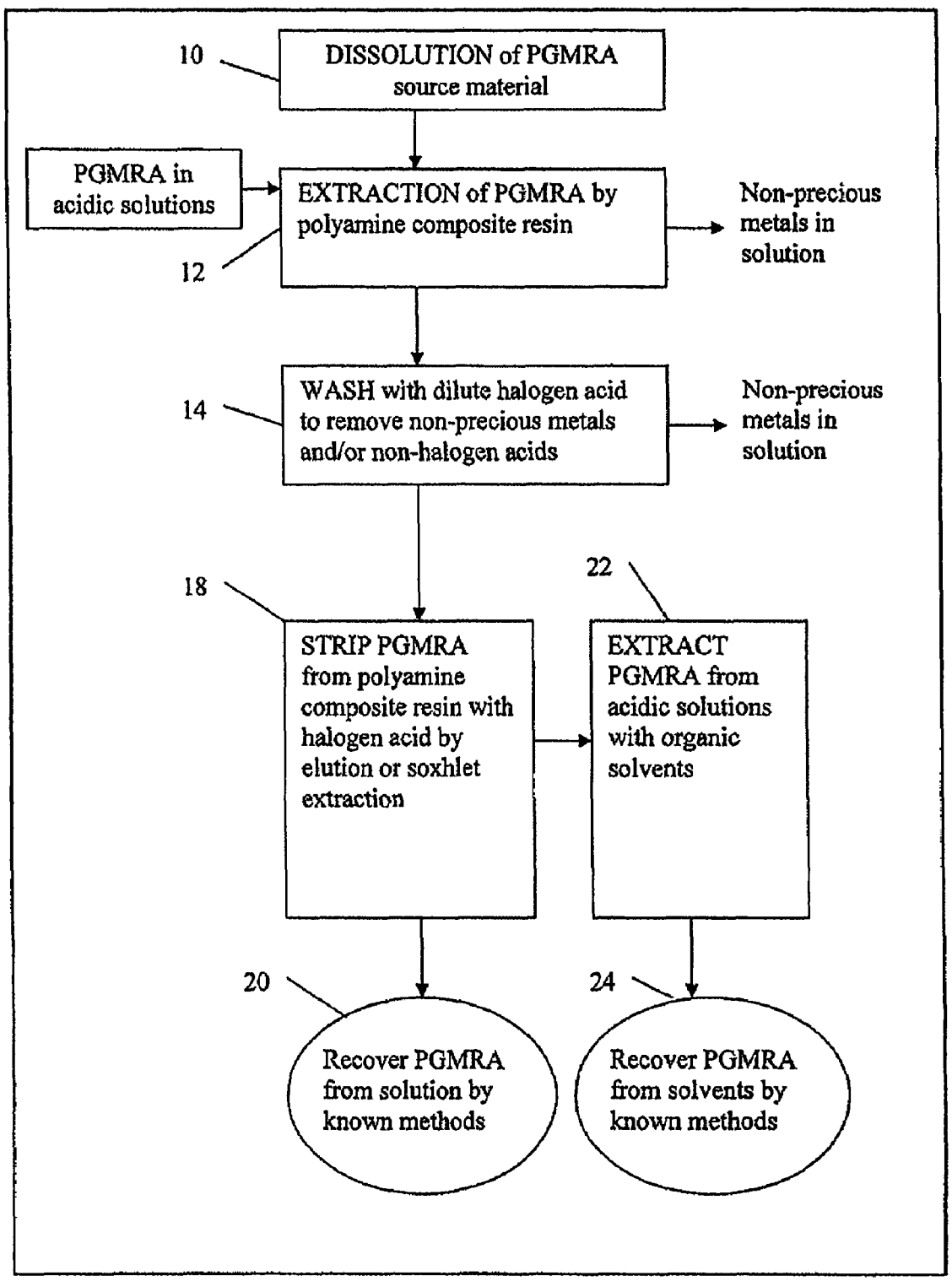
Figure 1. Schematic diagram of process without extraction of Rhodium

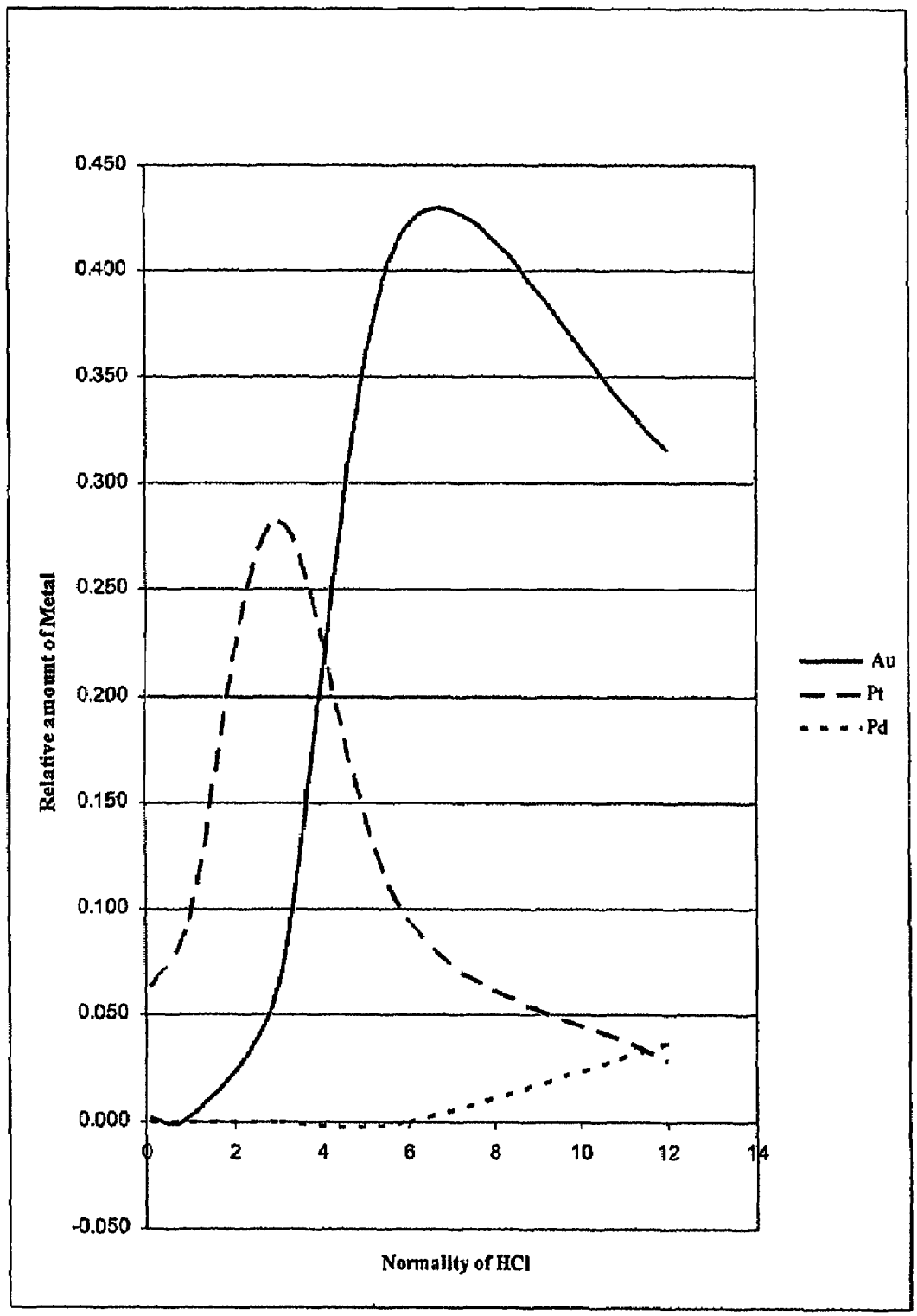
Figure 2. Relative extraction of gold, platinum and palladium from WP-1 as function of HCl normality at room temperature.

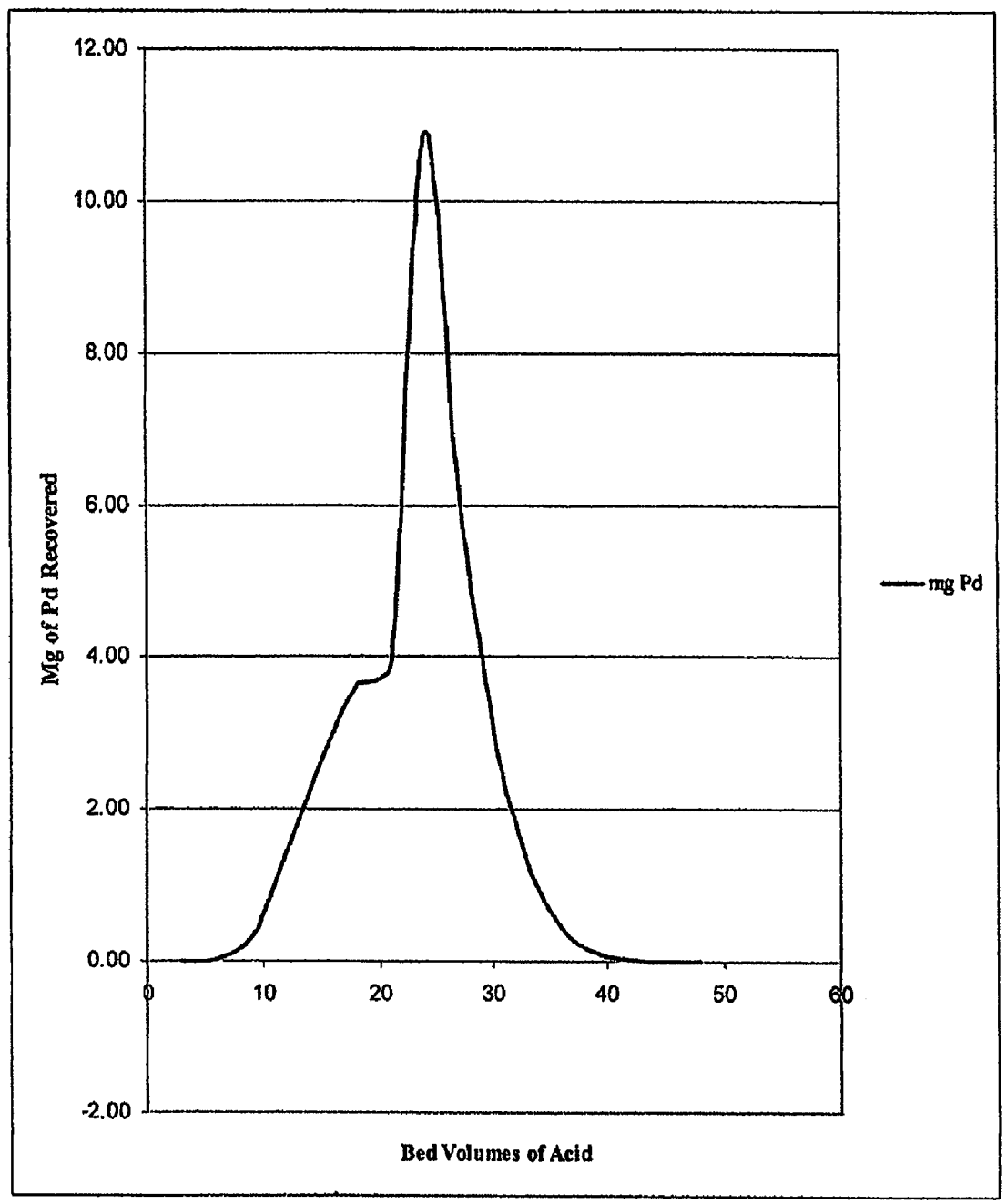
Figure 3. Elution of palladium from WP-1 using 4N HCl at room temperature for 18 bed volumes and 6N at 85C for final 20 bed volumes.

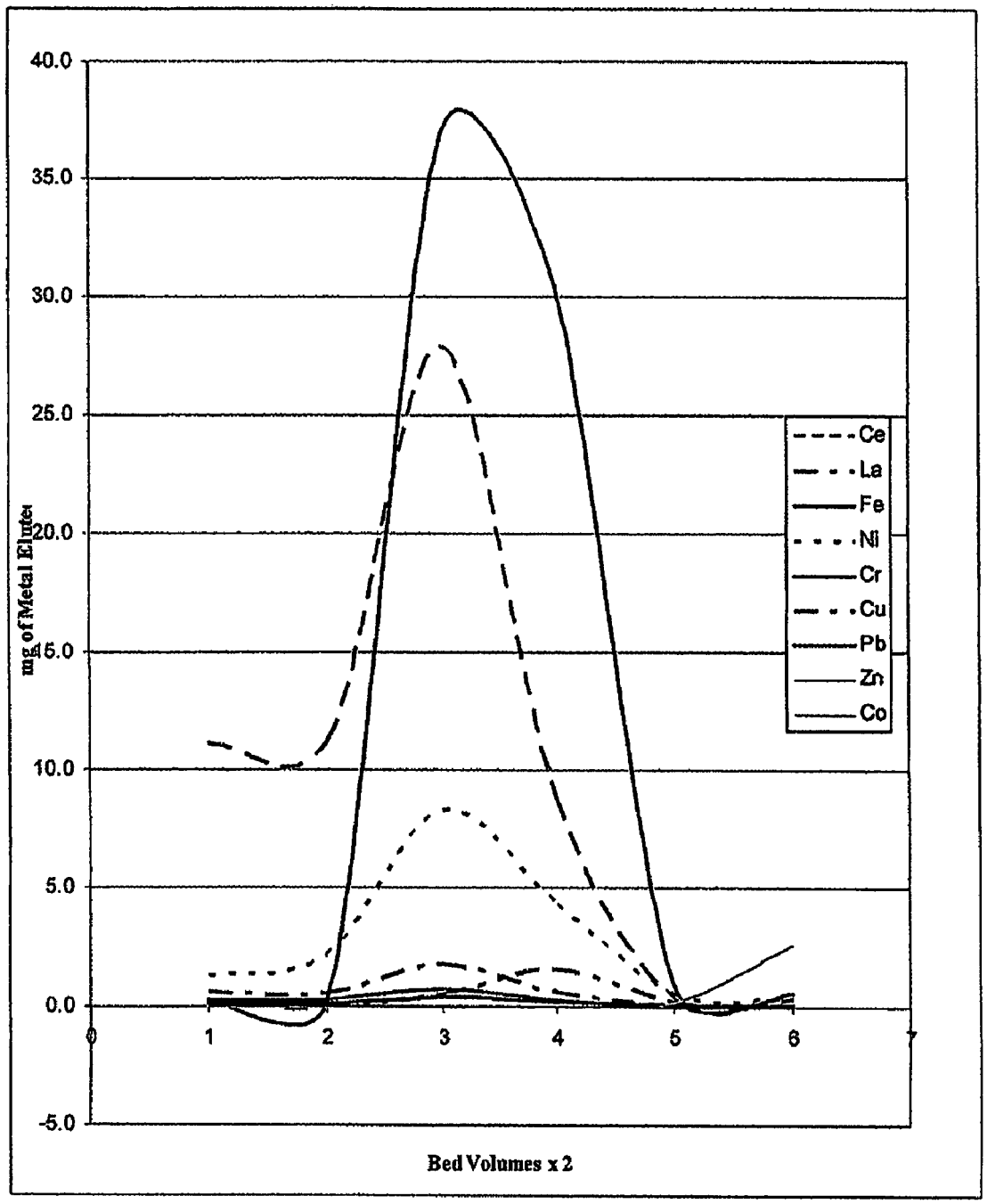
Figure 4. Elution of non-precious metals from WP-2 with 1N HCl.

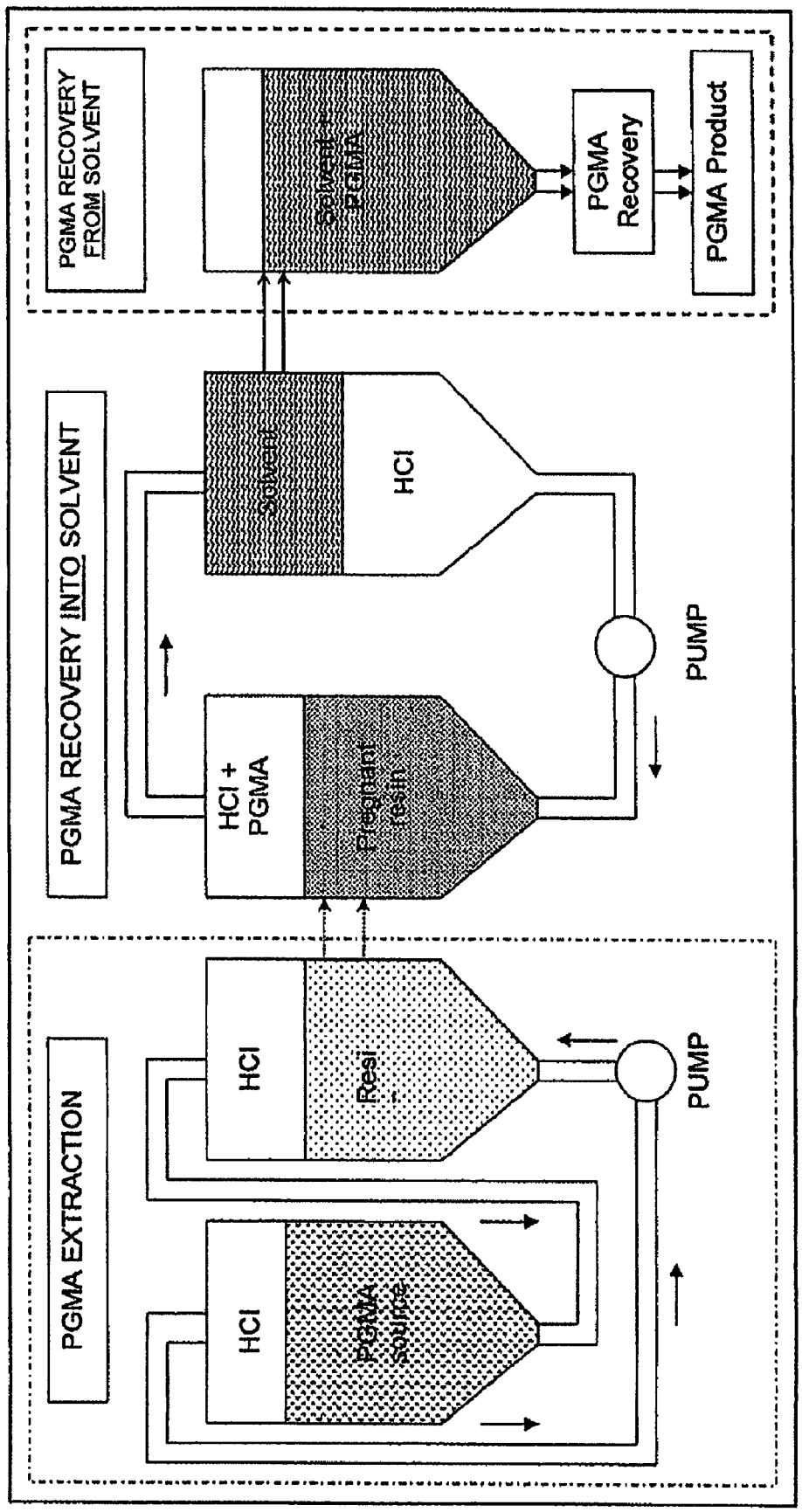
Figure 5. Schematic of PGMA extraction and recovery circuits.

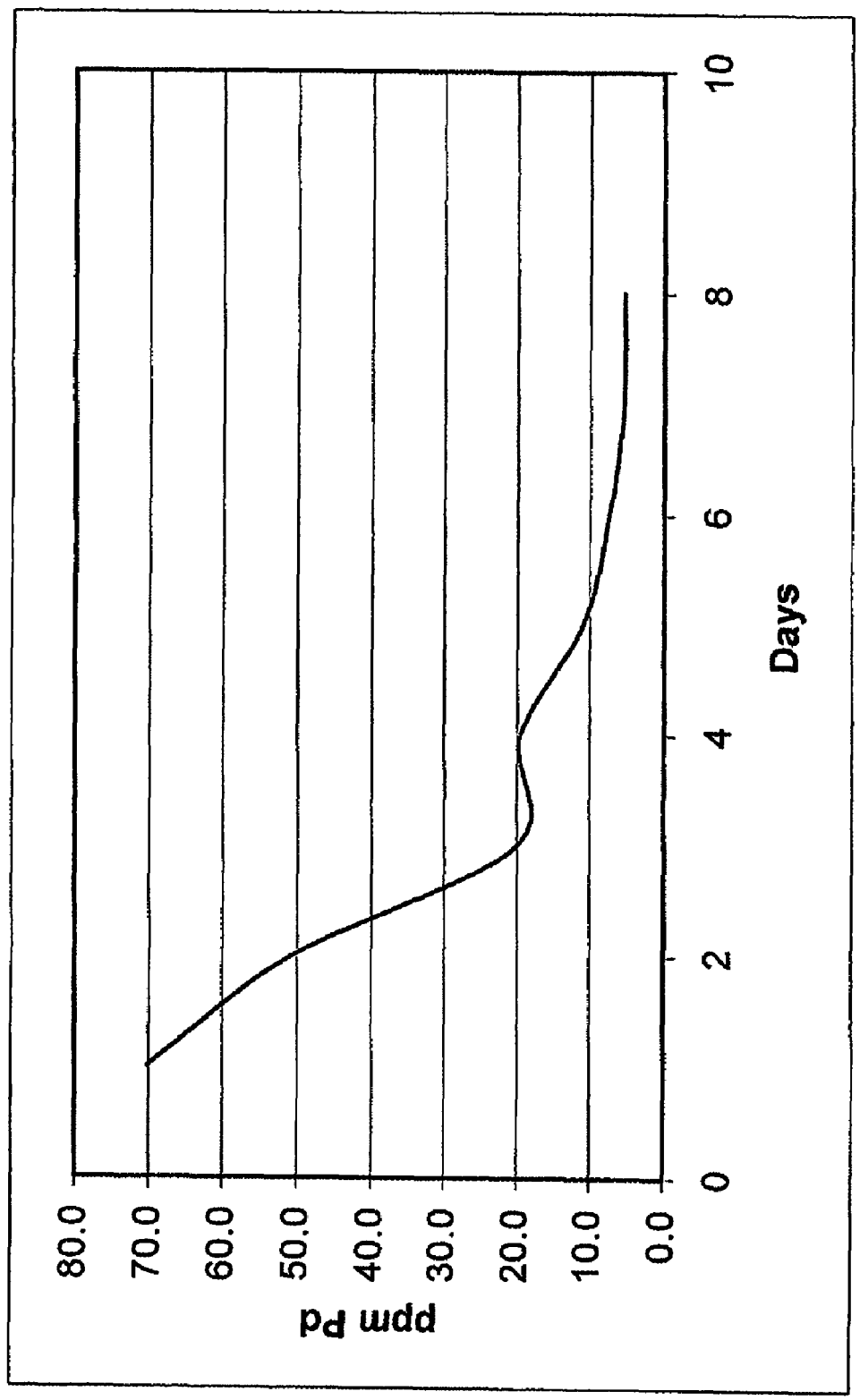
Figure 6. Pd concentration in acidic solution as function of time during second extraction with polyamine composite resin.

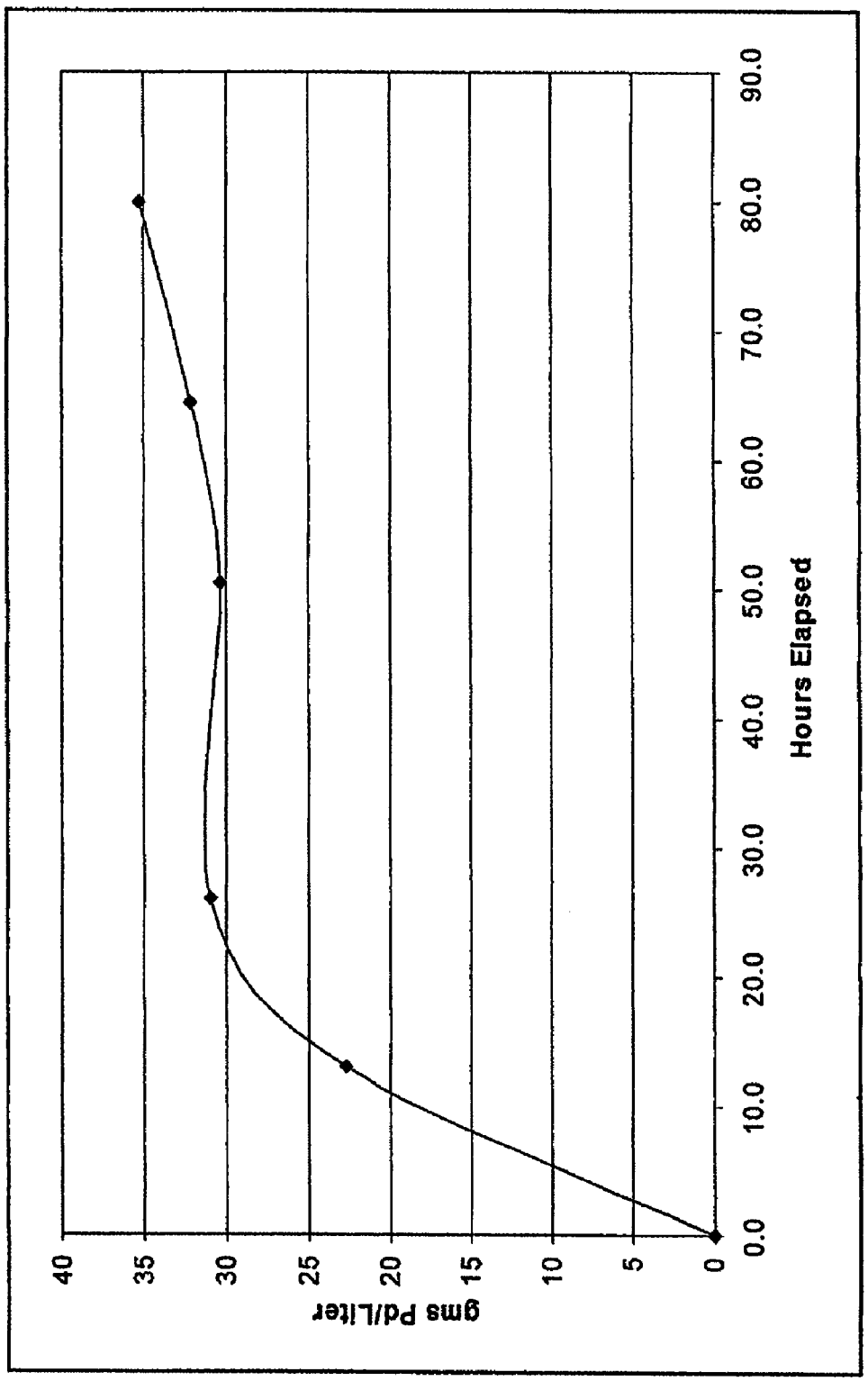
Figure 7. Extraction of Pd from acidic solution circulating through polyamine composite resin by di-n-octyl sulfide as function of time.

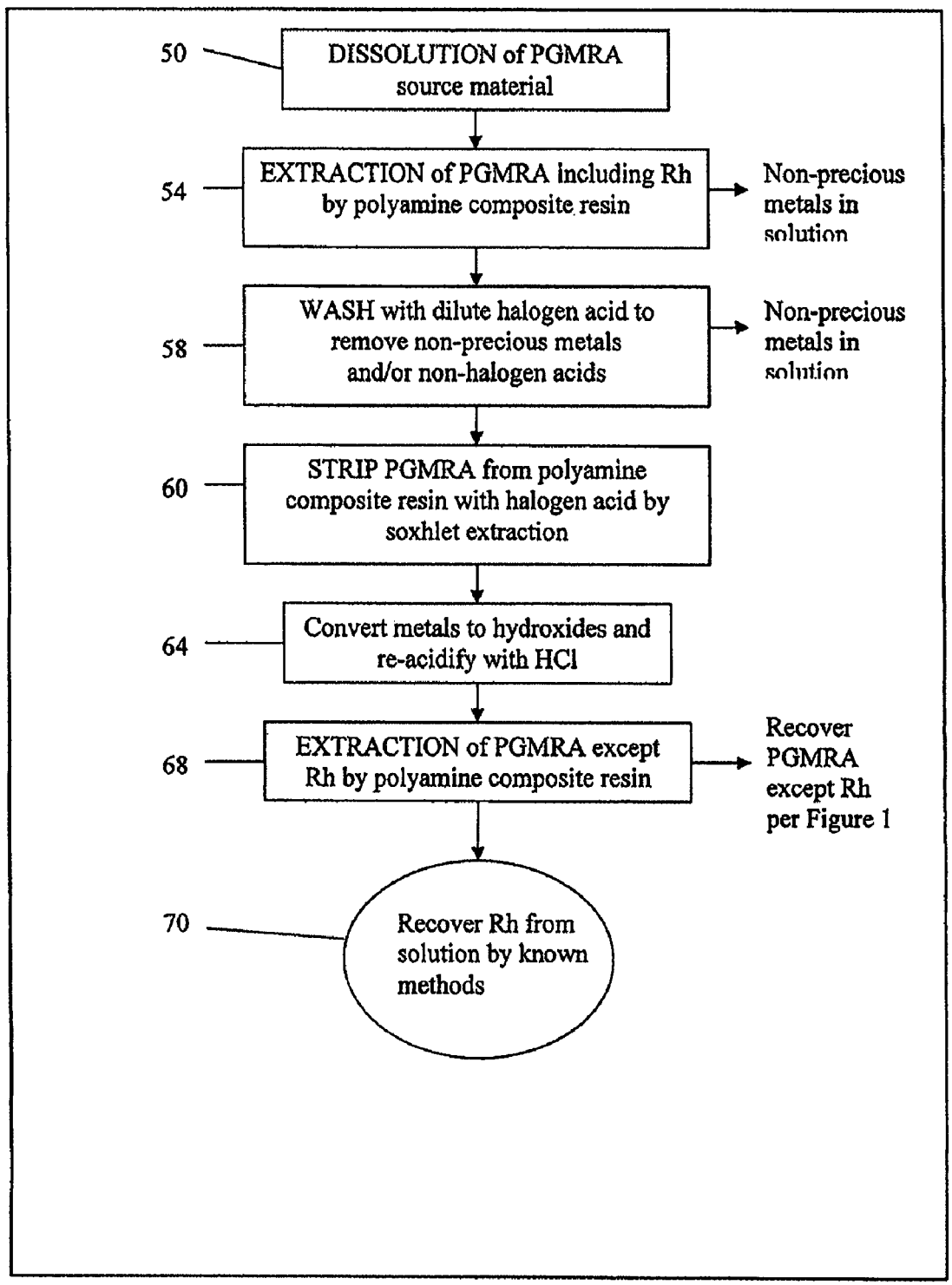
Figure 8. Process 1 with the separation of Rhodium from non-precious and other PGMRA metals.

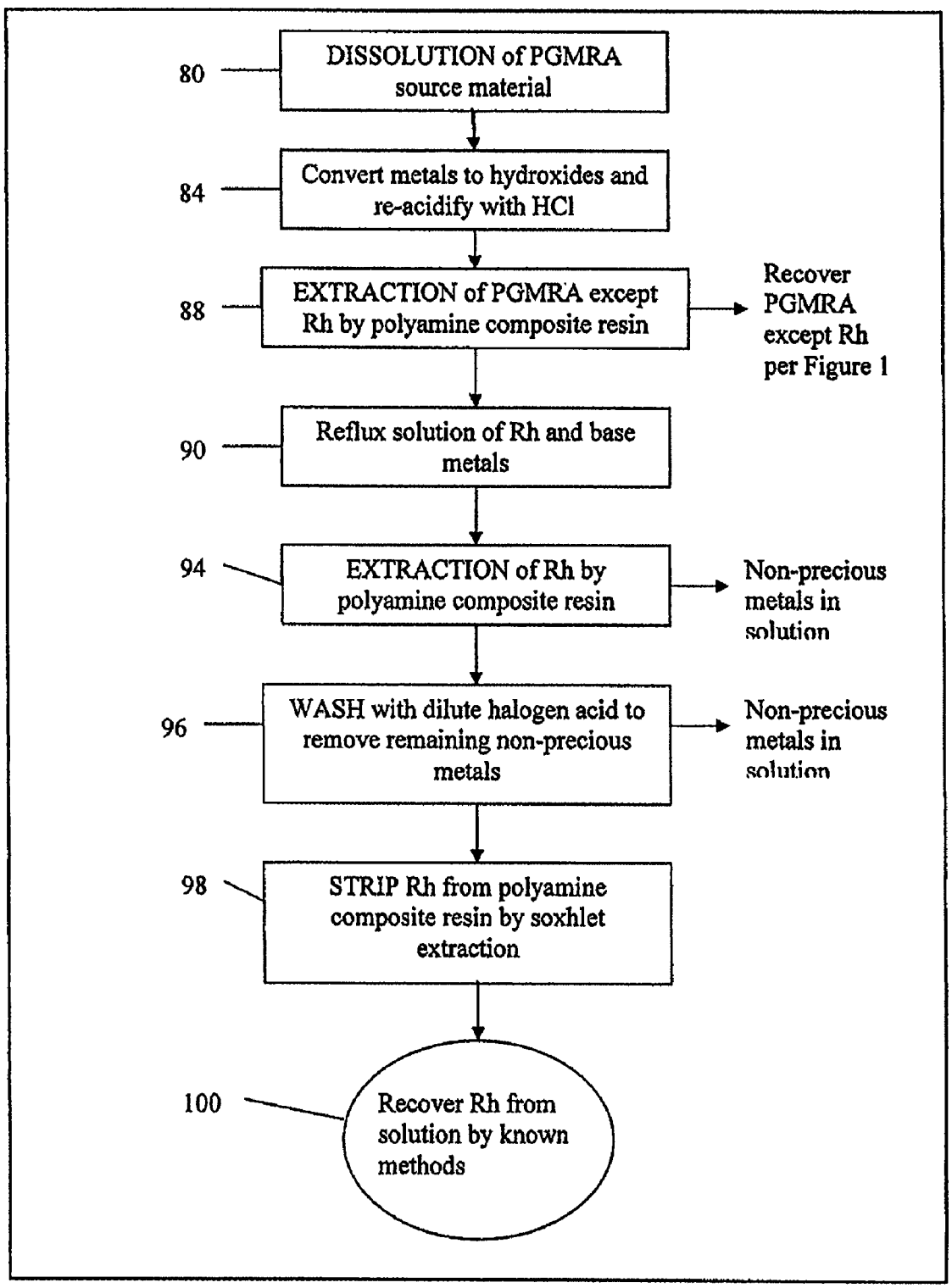
Figure 9. Process 2 with the separation of Rhodium from other PGMRA and non-precious metals.

PROCESS FOR RECOVERING PLATINUM GROUP METALS, RHENIUM AND GOLD

STATEMENT OF RELATED APPLICATIONS

This application is a continuation of PCT/US06/13708 filed Apr. 12, 2006. This application claims priority to provisional U.S. Patent application No. 60/671,260, filed Apr. 13, 2005, the disclosure of which is incorporated herein by reference.

BACKGROUND OF THE INVENTION

The field of the present invention is recovery of platinum group metals, rhenium and gold from source materials.

Recovery, purification and separation of valuable platinum group metals (platinum [Pt], palladium [Pd], iridium [Ir], rhodium [Rh], osmium [Os], ruthenium [Ru]) and rhenium [Re] and gold [Au] (PGMRA) are typically tedious processes requiring repeated application of pyrometallurgical, hydrometallurgical or electrowinning processes to achieve acceptable metal recovery and metal purity. Chemically simple source materials of platinum group metals, rhenium or gold may lend themselves to relatively straightforward processes with high recovery rates and high metal purity. However, most source materials such as ores, spent catalysts, plating solutions and sludges, ore concentrates and smelter mattes are chemically complex, not only because of the diversity of PGMRA elements but also because of the presence of non-precious metals in the source materials. Recovery, purification and separation of PGMRA elements from these source materials are considered exceedingly difficult.

Current industry practice largely relies on numerous chemical processes. These are at times used in combination with solvent extractions, often with high cost or high toxicity, to recover, separate and purify PGMRA elements. For elements such as Rh, there are no known solvent extraction processes; therefore, exceedingly tedious and very time consuming chemical dissolutions and precipitations are required to recover Rh of sufficient purity. Moreover, separation of Rh from other PGM metals such as Ir and Os is exceedingly difficult by any method.

Recovery of PGMRA elements from acidic solutions with ion exchange resins has had very limited success, in part because highly acidic solutions are required to dissolve the elements and the resins are hot stable in such solutions. For example, Amborane® (Rohm and Haas) recovers PGMRA elements but only from solutions with pH>2. Furthermore, all of the PGMRA elements are so tightly bound to Amborane® they may be separated from the resin as undifferentiated PGMRA only by thermal degradation of the resin. The concentrated PGMRA elements must then be recovered by the same tedious, time consuming and inefficient hydrometallurgical, pyrometallurgical process applied to the source materials, albeit somewhat simplified by exclusion of some of the non-precious metals.

Polyamine composite resins, as disclosed in U.S. Pat. No. 5,997,748 by Rosenberg et al., are specifically designed for recovery and separation of "heavy metals" as defined by Rosenberg et al. "These resins exclude all alkaline and alkaline earth metals and include the transition elements and the elements of the lanthanide and actinide series in the Periodic Table, as well as aluminum tin, lead, titanium and metalloids such as arsenic and selenium" (Column 9, lines 45-50).

Rosenberg et al. disclose non-specifically that the resins find utility in batch processes "for extracting precious metals from aqueous solutions" (column 12, lines 37-39) and "This hydrocarbylated extraction material is suitable for removing heavy metal ions and complex heavy metal ions from contaminated water from ppm range to less than one ppm, and for recovering precious metals" (column 14, lines 27-31). More specifically, Rosenberg et al. contemplate use of specific chelating functional groups of —$PR_1R_2$ (R=alkyl or aryl) for $Rh^{+1}$, $Pd^{+3}$ and —OCN for low-valent species of $Rh^{+2}$ and $Ru^{+2}$ (column 9, Table 1). The disclosure of U.S. Pat. No. 5,997,748 is incorporated herein by reference.

SUMMARY OF THE INVENTION

The present invention is directed to processing for the extraction of one or more metals of the group consisting of platinum, palladium, iridium, rhodium, osmium, ruthenium, rhenium, and gold (PGMRA).

In a first separate aspect of the present invention, the method includes binding at least one PGMRA metal dissolved in an acidic aqueous solution to extraction material. The material is non-cross-linked polyamine composite resin. The binding includes exposing the dissolved PGMRA metal to the extraction material. The non-cross-linked polyamine composite resin may include functional chelating groups. Further, the amount of extraction material may be limited so that just enough material is available for the amount of PGMRA metal present.

In a second separate aspect of the present invention, the method includes dissolving at least one PGMRA metal in an aqueous solution and then binding at least one dissolved PGMRA metal to extraction material. The material is non-cross-linked polyamine composite resin. The binding includes exposing the dissolved PGMRA metal to the extraction material. The dissolution could include a halogen acid sparged with an oxidant. Further, the oxidant may be the corresponding halogen element of the acidic aqueous solution. Dissolution can be affected by the selection of temperature and pressure.

In a third separate aspect of the present invention, the method includes binding at least one PGMRA metal dissolved in an acidic aqueous solution to extraction material. The material is non-cross-linked polyamine composite resin. The binding includes exposing the dissolved PGMRA metal to the extraction material. The at least one bound PGMRA metal is then eluted from the extraction material with an eluting acid. The eluting acid may be at least one of more active, more concentrated, hotter or under increased pressure over that of the acidic aqueous solution. A step-wise increase in stripping capacity may also be used to separate. PGMRA constituents.

In a fourth separate aspect of the present invention, PGMRA metal dissolved in an acidic aqueous solution is converted to hydroxides by adjusting the acid to pH 8-12 when one of the dissolved metals is rhodium. The solution is then reacidified to 0.1-0.5N HCl. The dissolved PGMRA with the exception of rhodium is then bound to extraction material of non-cross-linked polyamine and composite resin by exposing the dissolved PGMRA metal to the extraction material.

In a fifth separate aspect of the present invention, the fourth separate aspect is further contemplated to include the conversion of any aquorhodate and aquochlororhodate complexes to hexachlororhodate complexes with subsequent binding of the rhodium to non-cross-linked polyamine composite resin.

In a sixth separate aspect of the present invention, any of the foregoing aspects are contemplated to be combined to greater advantage.

Accordingly, it is an object of the present invention to provide improved methods of separating PGMRA metals. Other and further objects and advantages will appear hereinafter.

DESCRIPTION OF THE DRAWINGS

FIG. 1 is a schematic diagram of a process without the separation of Rhodium.

FIG. 2 is a graph of the relative extraction of gold, platinum and palladium from WP-1 as function of HCl normality at room temperature.

FIG. 3 is a graph of the elution of palladium from WP-1 using 4N HCl at room temperature for 18 bed volumes and 6N at 85 C for final 20 bed volumes.

FIG. 4 is a graph of the elution of non-precious metals from WP-2 with 1N HCl.

FIG. 5 is a schematic of PGMRA extraction and recovery circuits.

FIG. 6 is a graph of the Pd concentration as a function of time during second extraction.

FIG. 7 is a graph of the Pd extraction by DOS as function of time.

FIG. 8 is a schematic diagram of a process with the separation of Rhodium from non-precious and other PGMRA metals.

FIG. 9 is a schematic diagram of a process with the separation of Rhodium from other PGMRA and non-precious metals.

DETAILED DESCRIPTION OF THE PREFERRED EMBODIMENTS

Disclosed are processes for dissolution, extraction and recovery of platinum group metals (platinum [Pt], palladium [Pd], iridium [Ir], rhodium [Rh], osmium [Os] and ruthenium [Ru]), rhenium [Re] and gold [Au] (PGMRA) from acidic aqueous solutions, separation of PGMRA from non-precious metals, and separation of PGMRA elements from one another.

The processes of dissolution, extraction, separation and recovery of PGMRA elements from acidic solutions utilizing non-cross-linked polyamine composite resins are applicable to the precious metal industry. The procedures are relatively simple, use reagents that are of reasonable cost, and have minimal environmental consequences. These procedures require low capital cost, result in high recovery rates for PGMRA elements from source materials, and can result in PGMRA products of exceptional purity.

A process for recovering PGMRA is schematically illustrated in FIG. 1. PGMRA in solid source materials are dissolved in acidic solutions, step 10. PGMRA dissolved in step 10 or PGMRA source materials in acidic solution are extracted from solution through binding of the PGMRA to a non-cross-linked polyamine composite resin, step 12. As needed, the non-cross-linked polyamine composite resin is washed with dilute acid to elute non-precious metals (including alkali, base, transition and rare-earth), alkaline earths and/or non-halogen acids but not PGMRA, step 14. PGMRA may be stripped sequentially with acid and/or by soxhlet extraction, step 18. The purified PGMRA are then recovered from solution by known methods such as $SO_2$ reduction of Au, $NH_4Cl$ precipitation of $(NH_4)_4PtCl_6$, and other widely known methods, step 20. Alternatively, PGMRA stripped from the non-cross-linked polyamine composite resin, step 18, may be extracted from solution by one or more organic solvents, step 22. PGMRA may be recovered from the organic solvents by known methods such as aqueous ammonia stripping of Pd from di-octyl sulfide and precipitation of Pd $(NH_3)_3Cl_2$ by addition of HCl or by other widely used methods, step 24.

Dissolution of PGMRA from source materials may be achieved with any acid, but preferably with a halogen acid and more preferably with hydrochloric acid. Halogen acid with oxidants such as the corresponding halogen element or other suitable oxidant advantageously accelerates the dissolution process and results in a higher degree of PGMRA dissolution. Likewise, PGMRA dissolution may be accelerated or taken nearer to completion by use of increased temperature and/or pressure.

Extraction of PGMRA from acidic solution makes advantageous use of non-cross-linked polyamine composite resins (referred to as polyamine composite resin hereafter). The polyamine composite resins find utility for extracting the eight PGMRA including rhodium, palladium, and ruthenium in oxidation states of $Rh^{+3}$, $Pd^{+2}$, $Pd^{+4}$ and $Ru^{+3}$ from acidic solutions with acid normalities of 0.1 to 15 or higher (pH range of 1 to-1.7). PGMRA are strongly bound to polyamine composite resins while excluding many non-precious metals. The water-soluble polyamine composite resin extraction materials are characterized by an activated surface of non-cross linked polyamine groups that also may contain functional chelator groups. The polyamine and functional chelator groups individually or severally have very strong affinities for PGMRA metal ions and complexes. The activated surface may be built on a wide variety of inert particulated or webbed support materials (U.S. Pat. No. 5,997,748) that have no demonstrated effect on performance of the activated surface. However, a silica gel support is preferred. A polyamine-silica composite resin is remarkably resistant to acid concentrations up to 15N, useful for recovering tightly bound PGMRA elements from the polyamine composite resin. Two commercially available polyamine-silica composite resins, WP-1 and WP-2 produced by Purity Systems, Inc., are very effective for extraction, recovery and separation of the PGMRA metals. The functionality of the two polyamine composite resins for PGMRA elements, WP-1 without an added functional chelator group and WP-2 with an iminoacetic acid functional group, establishes that polyamine-silica resins with functional chelator groups different from those examined also are indicated in hydrometallurgical extraction of PGMRA elements. Similarly, polyamine composite resins on inert particulated or webbed supports other than silica gel are indicated because of their lack of demonstrated effect on the performance of the activated surface.

PGMRA elements are recovered from the polyamine composite resin by elution methods preferably with halogen acids. The elution methods can be advantageously varied in acid concentration, acid composition, temperature, procedures and apparatus to achieve specific objectives of separation and purification of PGMRA elements from one another and from other elements. Higher recovery rates and/or greater PGMRA product purity may be achieved by the combination of solvent extraction with or subsequent to elution. Rh may be separated from other PGMRA and non-precious metals by a process further utilizing polyamine composite resin that isolates Rh in solution. PGMRA may be recovered by one or many well known methods. PGMRA may be recovered from acidic solutions by addition of precipitating agents such as ammoniacal salts or reducing agents such as $SO_2$. PGMRA may be recovered from organic extractants by stripping them from the organic extractant into aqueous solutions and then addition of a precipitating or reducing agent. The teachings in example processes and methods are not intended to be limiting but rather allow for adaptation of processes and methods to accommodate specific PGMRA elements, resins and desired products.

Dissolution of PGMRA Source Materials

PGMRA can be dissolved into aqueous solutions from many source materials. Suitable PGMRA-source materials comprise spent alumina-, carbon- and silica-based PGM catalysts; PGMRA ores, concentrates and smelter mattes; plating solutions and sludges; dental, electronic and other waste; and automotive exhaust catalysts. PGMRA dissolution methods, typically through use of strong acids with or without oxidants, are widely known and used in the precious metal industry. Acidic solutions, regardless of the acid composition or use of oxidants, contain PGMRA in their normal oxidation state and will quantitatively bind to the polyamine composite resin. Obviously, ultimate PGMRA recovery rates are dependent on the efficacy of PGMRA dissolution and loading onto the polyamine composite resin, both of which can be readily determined by analysis of dissolution residues or solutions in contact with the resin after loading.

Although PGMRA may be extracted and recovered by the process described herein regardless of the acid composition, the halogen acids hydrobromic, hydroiodic and more preferably hydrochloric acid have found utility. Halogen acids preferably in combination with oxidants comprised of the corresponding elemental halogen or other suitable oxidant such as peroxide and halogen anions nearly quantitatively dissolve PGMRA even in refractory source materials. PGMRA in halogen acidic solutions are readily extracted by polyamine composite resins and subsequently stripped from the resin during recovery. Hydrochloric acid is preferable because the binding strength of PGMRA to polyamine composite resin is stronger, thus allowing nearly quantitative extraction of PGMRA from acidic solution.

The halogen acid dissolution reaction as exemplified by hydrochloric acid dissolution comprises three recognized processes: hydrogen ions from the hydrochloric acid are integral to dissolution of the PGMRA metals from source materials, chlorine oxidizes the PGMRA to the most common oxidation states and chloride ion either from reduction of chlorine or from chloride salts facilitates further dissolution and oxidation by forming PGMRA-chloride complexes. PGMRA-chloride complexes are readily soluble, thus effectively driving the dissolution reaction to the right as long as there is sufficient hydrogen ion and chlorine present. Dissolution may take hours to less than 10 days and is deemed complete when residual PGMRA concentrations in the source material achieve equilibrium values. Solutions containing PGMRA-chloride complexes are preferred in subsequent polyamine composite resin processes because the PGMRA can be readily separated and stripped from the resin.

Basic chemical principles confirmed by experimental data teach that PGMRA dissolution rates increase with increasing hydrogen ion and chlorine concentrations. In addition, higher hydrogen ion and chlorine concentrations facilitate dissolution of the less soluble PGMRA elements. Increasing temperature has competing contradictory effects. As is common to most chemical reactions the reaction rate (dissolution in this instance) increases with increasing temperature. However, increasing temperature also tends to decrease dissolution rates because chlorine solubility decreases from about 10,000 ppm at ambient temperature to about 0 ppm at 109° C. Thus for dissolution at ambient pressure (atmospheric pressure of about 14.7 psia), the chosen temperature must consider the competing and contradictory effects of temperature on reaction rate. Furthermore, vapor pressures increase with temperature and increase rapidly over 109° C., a temperature at which the partial pressure of HCl is one atmosphere. As a practical matter, pressurized reaction vessels (autoclaves) are used for reaction temperatures about 80° C. or higher to maintain high HCl and $Cl_2$ concentrations in solution.

HCl and $Cl_2$ concentrations may vary up to their solubility limits without adversely affecting dissolution reactions. In typical dissolutions, the concentrations vary widely from high initial to lower terminal values at the completion of dissolution; therefore, cited concentrations in specific examples vary widely. Polyamine composite resin extraction of some PGMRA as described below is affected by terminal acid concentration and is preferably done in absence of $Cl_2$. Thus, hydrochloric acid and chlorine concentrations are selected such that extensive chemical adjustments are not necessary at the conclusion of dissolution and prior to PGMRA extraction.

Pd and Au are among the most readily dissolved PGMRA metals in hydrochloric acid-chlorine solutions. Finely divided Pd and Au such as in catalysts with an alumina or carbon support and coarse-grained Pd and Au have been readily dissolved in a closed system at ambient temperature in 1-7 days in a solution with 0.001-9N HCl sparged by chlorine gas to achieve about 50-1,000 ppm $Cl_2$. Dissolution of Pd and Au on carbon substrates is particularly effective because the carbon substrate does not consume hydrogen ion, thus allowing for higher hydrogen ion concentrations in solution. Dissolution of Pd and Au from alumina substrates is also effective; however, the effective hydrogen ion concentration is decreased by simultaneous alumina dissolution.

Finely divided Pt and Rh may be dissolved with similar use of HCl and $Cl_2$ as for Pd and Au; however, Pt and Rh are advantageously dissolved at elevated temperatures. For example, automotive catalysts contain finely divided Pt and Rh as well as Pd along with high concentrations of numerous base and transition elements. Pd, base metals and transition elements are readily dissolved; however, Pt and Rh are resistant to dissolution. Pt and Rh are readily dissolved at ambient pressure nearly quantitatively with HCl and $Cl_2$ at about 50° C. or higher. For example, in one experiment 5 tons of automotive catalyst were placed in 1-12N hydrochloric acid and sparged with up to about 500 ppm $Cl_2$ at 70° C. for 9 days. A 70° C. dissolution temperature was determined experimentally as providing a balance between increasing reaction rate due to temperature and decreasing reaction rate due to decreasing $Cl_2$ solubility.

Dissolution of the Pt, Rh and Pd was essentially quantitative as over 99% of the contained metals were recovered in subsequent processing.

Relatively coarse-grained Pt and Rh as well as Ir, Os; Re and Ru of any grain size may also be dissolved at about 70° C.; however, dissolution occurs more rapidly at higher temperatures and preferably in a pressurized reactor. Pressure increases rapidly above 109° C. and highly reactive HCl and $Cl_2$ gases require increasingly costly and elaborate containment vessels. A practical limit of about 150° C. was dictated by the cost of the reaction vessel. For example in one experiment including a pressurized reaction vessel, relatively insoluble PGM metals including Rh were recovered nearly quantitatively after dissolving them for several hours in a pressurized autoclave at 120-130° C. with varying 0.01-12N HCl and about 1-100 psig $Cl_2$.

Chloride salts either added to the acid solution or formed by $Cl_2$ oxidation of PGMRA metals provide $Cl^-$ ions that facilitate dissolution. If chloride salts are added the salt is to be selected such that the cation of the salt does not become a contaminant in PGMRA product or otherwise adversely react with the polyamine composite resin. Chloride ions from dissolved chloride salts provide a high background concentration of chloride ions that facilitates formation of the terminal PGMRA-chloride complex dissolution products. Therefore, chloride salts may be used advantageously as relatively inexpensive sources of Cl— ions to facilitate dissolution and reduce the amount of hydrochloric acid required to dissolve PGMRA.

PGMRA are dissolved from nearly any source material with hydrochloric acid-chlorine solutions; however, dissolution of PGMRA in source materials that consume abundant amounts of HCl may reduce economic viability of the method if there are not compensating effects. Hydrochloric acid-chlorine dissolution is preferably directed to source materials with readily dissolved PGMRA such as Au and Pd or to materials with any PGMRA metal and limited amounts of soluble alumina, other minerals or other materials that consume hydrogen ions.

Dissolution of PGMRA metals from alumina-containing catalysts provides an illustrative example of the often complex and sometimes contradictory effects on PGMRA dissolution in hydrochloric acid in the presence of acid-consuming materials such as alumina. The PGMRA metals are deposited on one or both the $\alpha$- and $\gamma$-crystalline structures of alumina. One of these forms, believed to be the $\gamma$-structure, is soluble in hydrochloric acid. The pH of the solution is initially low when concentrated hydrochloric acid is added, but slow dissolution of alumina results in a solution of pH 2-4. Addition of more acid will initially lower the pH once again but dissolution of alumina will raise the pH, thus lowering the dissolution rate of PGMRA elements.

In spite of an alumina substrate, Pd and Au can be economically recovered from catalysts. Pd and Au are dissolved relatively easily and rapidly without having to resort to highly concentrated acid. Solutions with 2-4 pH are adequate to dissolve Pd and Au. Dissolution of alumina is relatively slow compared to Pd and Au; therefore only limited amounts of HCl are consumed by alumina dissolution. Dissolution of alumina provides compensating factors, however. Pd and Au may be extracted with polyamine composite resin resulting in a stripped aluminum chloride solution. Several benefits accrue from recycling the stripped solution for additional Pd and Au dissolution: the waste stream is reduced, the aluminum chloride suppresses dissolution of more alumina with consequent HCl consumption, and the high Cl— concentration facilitates Pd and Au dissolution. Solutions can be recycled until the concentration of other elements contaminated product or reduce the ion exchange capacity of the polyamine composite resin.

Materials with PGMRA such as Pt and Rh that are very resistant to dissolution are dissolved by hydrochloric acid-chlorine solutions; however, the dissolution method is preferably directed to source materials with relatively low amounts of other acid-consuming components such as alumina. For example, typical automotive catalyst contains economic concentrations of Pd, Pt and Rh but only a limited amount of alumina that is present as a wash coat on an inert substrate. Aggressive hydrochloric acid-chlorine solutions and elevated temperatures dissolve the relatively small amounts of alumina. Once the alumina is consumed high acid concentrations most favorable for dissolution of the Pt and Rh can be achieved. As described above, Pt and Rh have been nearly quantitatively recovered at 70° C. from automotive catalysts with concentrated hydrochloric acid and modest concentrations of $Cl_2$.

Extraction of PGMRA from Acidic Solutions

Ion exchange resins such as polyamine-silica composite resin extract 8 PGMRA elements—Pt, Pd, Ir, Rh, Os, Ru, Re and Au from acidic solutions with acid normalities of 0.1-15 N. Other ion exchange resins are unsuitable because they are either chemically unstable at such high acid concentrations or fail to bind the PGMRA elements to the resin at acid normalities greater than 0.1N.

Eight PGMRA elements are nearly quantitatively extracted by polyamine composite resins. Each of the elements has substantially different chemical reactivities; therefore, different extraction efficiencies might be expected for each of the elements. Different extraction efficiencies with polyamine composite resins are not observed, however. Furthermore, PGMRA are extractable with polyamine composite resins singly or in several combinations from acidic solutions even in the presence of high concentrations of Al, base metals, transition elements and rare-earth elements. Typically, however, PGMRA are extracted as a group and separated in subsequent processing. At least 90% of the PGMRA is extracted by the polyamine composite resin and frequently more than 99% as evidenced by exceptionally high recovery rates of PGMRA from source materials. Moreover, the extraction efficiency is independent of the acid composition. PGMRA have been extracted with high efficiency from acids comprising perchloric, nitric, sulfuric, hydrochloric, hydrobromic and the like.

PGMRA are bound to the activated surface of the polyamine composite resin during extraction. The strength of binding between the PGMRA element and the resin is typically referred to as the binding constant. The concentration of the acid is used herein as a proxy for the binding strength or binding constant. That is, the higher the acid concentration required to mobilize or elute the PGMRA from polyamine composite resin, the higher the binding constant for that element. Experiments with WP-1 and WP-2, which vary slightly in chelating components on the resin, indicate that WP-1 generally has higher binding constants for PGMRA elements than WP-2; however, both efficiently extract PGMRA from highly acidic solutions.

Extraction of PGMRA elements from acids such as perchloric, nitric and sulfuric are highly efficient independent of acid strength. The binding constants for PGMRA elements dissolved in such acids are extremely high. PGMRA deposited on polyamine composite resin from these acids is so tightly bound PGMRA are not partitioned to an appreciable extent into solution no matter the strength of the acid. Therefore, PGMRA elements may be loaded onto the polyamine composite resin regardless of the concentration of these acids with little or no concern for non-quantitative extraction.

Hydrochloric, hydrobromic and possibly hydroiodic acid solutions of PGMRA extract and recover PGMRA with polyamine composite resins. Although the PGMRA-resin binding strength is high for all of the elements and thereby suitable for extraction, there is substantial variation in the binding strength of individual elements to the polyamine composite resin. Variable binding strength is both disadvantageous and advantageous. It is disadvantageous because extraction of individual PGMRA can vary with acid concentration, thus increasing the possibility of non-quantitative extraction. It is advantageous, however, in subsequent recovery as described in the next section. Hydrochloric acid is preferred and cited in most examples because the binding strength is sufficiently high for efficient PGMRA extraction but not so high as to preclude recovery of bound PGMRA from the resin, individual PGMRA have a range of binding strengths, widespread use in the precious metal industry, relatively low cost, and manageable risk to personnel and environment.

Extraction of PGMRA from acidic solutions such as hydrochloric is controlled by competition between hydrogen ions and PGMRA ions/complexes for binding sites on the polyamine composite resin. The equilibrium is established by the concentration and binding strength of each. Fortunately, the binding strength for hydrogen ions is relatively less than PGMRA in hydrochloric acid; therefore, the equilibrium concentrations of hydrogen and PGMRA ions/complexes on the resin can be manipulated by varying concentrations. For example, high hydrogen ion concentrations will tend to displace PGMRA ions/complexes on the polyamine composite resin and the equilibrium concentrations of PGMRA ions/complexes remaining in solution will be relatively high. Similarly, if hydrogen ion concentrations are relatively low, PGMRA ion/complexes will displace hydrogen ions and be preferentially bound to the resin.

High PGMRA extraction efficiency from acidic solutions is indicative of high binding strength of PGMRA to the polyamine composite resin and very low concentrations of PGMRA remaining in solution. Elution of the loaded polyamine composite resin with barren acid should not strip appreciable amounts of tightly bound PGMRA from the resin. Elution experiments with hydrochloric acid of different concentrations demonstrate that binding strength and hence extraction efficiency for some PGMRA is dependent on hydrogen ion concentration. For example, Pt is the most readily mobilized or eluted element at ambient temperature. A minute fraction of Pt may be eluted with 0.1N HCl and the relative amount eluted increases with increasing HCl normality up to about 3N HCl (FIG. 2). Au is more tightly bound to the polyamine composite resin as evidenced by peak elution at about 7N HCl. Small amounts of Pd are eluted even at 12N HCl. The binding strength of Ir, Ru, Re and Os are comparable to Pd. Rh is so tightly bound that it is not eluted at detectable concentrations with 12N HCl at ambient temperature.

As a general rule, loading of PGMRA by exposing PGMRA-bearing solutions to the polyamine composite resin is done with the lowest practical acid concentration so as to preferentially bind PGMRA to the resin. Controlling hydrogen ion concentration is particularly important for Pt and Au which are bound the least strongly. The pH of Pt and Au solutions may be as high as about pH 8 where Pt and Au forms precipitates; however, a pH of less than about 4 is preferred to reduce binding of base metal and transition elements to the polyamine composite resin. Even Pd with a relatively high binding constant is not quantitatively bound to the resin. For example, equilibrium concentrations of Pd may be as high as 100 ppm in a pH 2-4 loading solution. Loading of Ir, Re, Ru and Os are comparable to Pd. Rh readily binds to the polyamine composite resin even in highly concentrated 12N HCl.

Loading of PGMRA onto the polyamine composite resin is readily achieved by circulating PGMRA-bearing solutions through the resin until PGMRA concentrations remaining in solution reach equilibrium values in a few hours to 7 days depending on the volume of acid solution and concentration of PGMRA in the solution. In a preferred extraction method, polyamine composite resin is placed in a cylindrical or conveniently shaped extraction container with a conical base. The pregnant solution is pumped through the polyamine composite resin into the bottom of the extraction container at a rate sufficient to slightly fluidize the resin bed. As the solution passes through the polyamine composite resin some of the PGMRA is stripped from the solution. The partially stripped solution flows out of the top of the extraction container and back into the dissolution container where it washes the dissolution residue before being pumped through the resin. Extraction is continued until PGMRA concentrations in the solution reach equilibrium values.

Extraction of PGMRA from the pregnant solution may be the first step in purification of PGMRA. For example, pregnant Pd solutions may contain substantial amounts of Fe, Cu and other base and transition metals. Base and transition metals are known to have lower binding constants than PGMRA. In the first loading of Pd onto the polyamine composite resin, the amount of resin is chosen to be barely sufficient or slightly less than sufficient to extract Pd. The solution is repeatedly circulated through the resin. Pd, with a higher binding constant than base or transition elements tends to displace less tightly bound base and transition elements from the polyamine composite resin.

Although extracting Pd with polyamine composite resin nearly saturated with Pd increases the equilibrium concentration of Pd remaining in solution, displacement of base and transition elements into the solution by Pd improves the purity of Pd on the resin. Equilibrium concentrations of Pd in solution remain about 100 ppm at pH 2-4 when the resin nearly saturated with Pd. Most of the Pd can be recovered in a second extraction in which the solution is passed over sufficient new or recycled resin to bind with a vast majority of the remaining Pd. Other PGMRA may be extracted and purified by similar methods although residual Rh concentrations in solution tend to be nearly undetectable because of its exceptionally high binding constant.

Recovery of PGMRA

Recovery of PGMRA from the loaded or pregnant polyamine composite resin is effected by stripping PGMRA from the resin with acidic solutions, thus allowing recovery of PGMRA and leaving the stripped resin for further use.

The very high to extremely high binding constants for PGMRA on polyamine composite resin in perchloric, nitric and sulfuric acids is beneficial to extraction of PGMRA from solutions, but the binding constants make recovery of PGMRA from the resin difficult. Binding constants for PGMRA are so high, only minute fractions can be stripped from the polyamine composite resin at ambient temperatures even using highly concentrated acids. For example, stripping with highly concentrated $HClO_4$ r $HNO_3$ requires an impractical 1500-2100 bed volumes (Table 1).

TABLE 1

Elution of Pd with nitric and perchloric acids

| ELEMENT | ACID | ACID NORMALITY | STRIPPING RATE (% of metal on resin/bed volume) |
|---|---|---|---|
| Pd | $HNO_3$ | 0.1 | 0.040 |
|  | $HNO_3$ | 1 | 0.048 |
|  | $HNO_3$ | 15 | 0.048 |
| Pd | $HClO_4$ | 0.1 | 0.003 |
|  | $HClO_4$ | 1 | 0.007 |
|  | $HClO_4$ | 6 | 0.011 |
|  | $HClO_4$ | 12 | 0.065 |

The exceptionally high PGMRA-polyamine composite resin binding constants and low stripping rates of PGMRA in perchloric, nitric and sulfuric acids effectively precludes practical recovery and/or separation of PGMRA elements.

Fortunately, these dissolving acids can be eluted from the polyamine composite resin by other acids with greater utility such as hydrochloric and hydrobromic by simply washing the resin with the desired acid. Eluting the resin with these acids suggests alteration of the chemical species present as evidenced by rapid and significant color change of PGMRA bound on the polyamine composite resin. Even if the chemical species are not changed by elution with hydrochloric or hydrobromic acid, the significant result is that PGMRA are not as strongly bound to the resin in hydrochloric or hydrobromic acid solutions. Recovery of PGMRA by methods other than destruction of the polyamine composite resin as typically necessitated with perchloric, nitric and sulfuric acids now is possible.

As previously described, Pt and Au can be stripped most efficiently from WP-1 resin with 3-4N and 6-7N HCl respectively (FIG. 2) at ambient temperature and Pd is stripped sparingly in 12N HCl. Os, Ir, and Ru are likewise stripped sparingly by 12N HCl (Table 2).

TABLE 2

Elution of Ir, Ru and Os from WP-1 resin with 12 N HCl

|  | Ir | Ru | Os |
|---|---|---|---|
| mg metal in solution | 2 | 2 | 2 |
| Normality of loading solution | 0.2 | 0.2 | 0.2 |
| mg metal in extracted solution | 0.05 | 0.13 | 0.03 |
| % of metal extracted | 97.5 | 93.5 | 98.5 |
| Volume of resin | 10 | 5 | 5 |
| Volume of 12N HCl | 45 | 45 | 45 |
| Bed volumes | 4.5 | 9.0 | 9.0 |
| mg metal in eluted solution | 0.43 | 0.33 | 0.04 |
| % of metal recovered | 21.5 | 16.5 | 2.0 |

Rh is so tightly bound that it is not appreciably stripped by 12N HCl at ambient temperature. If a more practical recirculating system is employed rather than a column, stripping may be less effective than with barren acid because PGMRA concentrations increase in the acid and reduce the amount stripped from the polyamine composite resin. However, repeated contact of the resin with eluting acid can compensate for lower extraction efficiency in a single contact. PGMRA may be approximately ranked from most readily recovered to least readily recovered with HCl into the order of Pt; Au; Re, Os, Ir and Ru; Pd; and Rh.

Substantially higher and more practical stripping of PGMRA may be achieved at higher temperature or with use of hydrobromic and possibly hydroiodic acids.

In an experiment to determine the effect of temperature, attempts to recover Pd from WP-1 were first made at ambient temperature and then at elevated temperature. In the first stage, 18 bed volumes of 4N HCl at ambient temperature eluted only a small fraction of the Pd from the resin (FIG. 3). Elution with the 6N HCl at 85° C. resulted in stripping of substantially more Pd; however, an additional 20 bed volumes of hot Hcl were required to recover all of the Pd. Although Pd recovery was essentially complete with 6N HCl at 85° C., the large volume of elutriant required to strip the Pd is indicative of a low stripping rate that has limited practicality.

Tightly bound PGMRA can be efficiently stripped with a procedure including repeated contact of acid with loaded polyamine composite resin at higher temperature. Soxhlet extraction, a widely used technique in the chemical industry, is very effective but any similar technique including repeated contact of acid with the resin would also strip PGMRA elements from the resin. Although the nominal working range of polyamine-silica composite resin is stated to be pH 3-10 for WP-1 and pH 1-10 for WP-2 by Purity Systems, Inc., the polyamine composite resin is surprisingly stable at far higher acid concentrations. The polyamine composite resins have been used repeatedly in 12N HCl (pH=−1.1) with no apparent decrease in functionality. Soxhlet extraction with constant-boiling 6N HCl at 109° C. for more than 24 hours does not appear to have an adverse effect on resin functionality either. Soxhlet extractions with acids such as HCl and HBr may be more practical because PGMRA elements are more effectively stripped and less extraction time is required to completely strip the PGMRA elements. However, soxhlet extraction with acids such as perchloric, nitric and sulfuric that have low stripping rates will also work, but less rapidly. Soxhlet extractions with different acids may provide distinct methods to separate PGMRA metals from one another.

Soxhlet extraction, for example, was used to recover tightly bound Pd from WP-2 resin. Pd dissolved from 500 grams of an alumina-based catalyst containing about 140 ppm Pd was soxhlet extracted from polyamine-silica composite resin with 6N HCl for 6 hours at 109° C. 71 mg of Pd was recovered by precipitation from the acid. Pd recovery was >99.5% and the final Pd purity was >99.99%. The concentrations of Co, Cr, Mn, Ni, Ti, As, Ba, Cd, Ce, Mg and Pt were <1 ppm whereas Ca, Mo, Zn and Fe were 61, 13, 4 and 3 ppm respectively in the Pd. In another experiment, Pd from an alumina-based catalyst with about 2000 ppm Pd was loaded onto the polyamine composite resin at pH 2. A total of 640 mg was recovered by soxhlet extraction and precipitation. Pd recovery exceeded 99.6%. Although chemical precipitation was used to isolate a Pd precipitate from the soxhlet solution, any method for isolating the Pd would give comparable results.

Soxhlet extraction is appropriate for recovery of any of the PGMRA elements. The least tightly bound PGM element, Pt, is readily recovered and the most tightly bound PGM element, Rh, also is readily recovered by soxhlet extraction with HCl (Table 7). Clearly, PGMRA elements with binding constants between Pt and Rh are readily recovered by soxhlet extraction or any other similar method utilizing repeated contact of the polyamine composite resin with the recovery acid.

Other acids such as hydrobromic and possibly hydroiodic may be more effective in recovering tightly bound elements from polyamine composite resin than hydrochloric. For example, elution experiments with concentrated HBr stripped over 7% of the Pd per bed volume from the resin at ambient temperature (Table 3). The high stripping rate in hydrobromic acid indicates that Pd has a relatively low binding strength to the resin and could be effectively recovered in a recirculating system rather than a column. Hl may also be effective; however, initial results are uncertain because the Hl concentration in the elutriant is not well known.

TABLE 3

Elution of Pd and Pt with hydrobromic and hydroiodic acids

| ELEMENT | ACID | ACID NORMALITY | STRIPPING RATE (% of metal on resin/bed volume) |
|---|---|---|---|
| Pd | HBr | 0.1 | 0.012 |
|  | HBr | 1.0 | 0.006 |
|  | HBr | 8.8 | 7.055 |
| Pt | HCl/HI | 12.0 | 0.205 |

Recovery of PGMRA by acid stripping may be advantageous with process optimization. Acid composition is significant because acids comprising hydrochloric, hydrobromic and possibly hydroiodic are more effective in recovering PGMRA elements than others comprising perchloric, nitric, sulfuric and the like. PGMRA recovery rates increase with acid concentration, temperature and repeated contact of acid with loaded polyamine composite resin. Furthermore, hydrochloric, hydrobromic and hydroiodic acid concentrations can be increased by pressurizing the recovery system with the corresponding gas.

Separation of PGMRA from Non-Precious Metals

Many PGMRA source materials contain base and transition elements that can contaminate recovered PGMRA or complicate conventional PGMRA recovery methods. As described above, extraction of PGMRA onto polyamine composite resins saturated or nearly saturated with PGMRA can exclude significant amounts of base and transition elements from PGMRA products. Washing of PGMRA-loaded resin with barren acid solutions will remove solution adhering to the resin as well as strip some of the less tightly bound base and transition elements from the resin. An appropriate acid concentration is one that effectively strips base and transition elements without stripping significant amounts of PGMRA.

In the following examples, at least nine non-precious metals are readily separated from acid-dissolution liquor from spent automotive catalysts. Recovery of PGM (gold and rhenium are not present) from spent automotive catalysts is one of the most technically challenging processes for recovery of PGM. The described process is readily adapted to accommodate separation of PGMRA from dissolution of similar but less chemically complex materials.

In one experiment, metals in a spent automotive catalyst were dissolved in concentrated HCl sparged with $Cl_2$. The pH was adjusted to about 2 and PGM metals were loaded onto a polyamine composite resin. 100 ml of the pH-adjusted solution were loaded onto 20 ml of WP-2 resin. The resin was eluted with 1N HCl to remove non-precious metals. Even though the polyamine-silica composite resins were specifically designed to extract heavy metals (selected base and transition elements), their nominal operating range is $\leq 0.001N$ acid for WP-1 and <0.1N for WP-2. Elution of the pregnant resin with about 1N HCl readily removes base, transition and rare-earth elements from the polyamine composite resin in about 2.5 bed volumes (FIG. 4).

In another experiment, 100 ml of solution from automotive catalyst with acid concentration of 0.01N HCl were loaded onto 20 ml of WP-2 resin. Pd and Rh were quantitatively extracted and a majority of Pt was extracted by the resin (Table 4). Pt recovery could be increased by using WP-1 resin with a higher binding constant for Pt than WP-2. With exception of Cu, the vast majority of non-precious metals were not extracted by the resin and remained in the elutriant.

TABLE 4

Selective extraction of PGM elements by WP-2 from automotive catalyst solution

|  | Pt | Pd | Rh | Ce | La | Fe | Ni | Cr | Cu | Pb | Zn | Co |
|---|---|---|---|---|---|---|---|---|---|---|---|---|
| Initial solution, mg | 25.5 | 5.3 | 1.2 | 404 | 26 | 181 | 74 | 11 | 3.9 | 49 | 30 | 1.0 |
| Solution after resin, mg | 5.1 | 0.0 | 0.0 | 400 | 26 | 168 | 73 | 11 | 0.8 | 42 | 24 | 0.9 |
| % metal on resin | 83 | 100 | 100 | 1.0 | 0.0 | 7.2 | 1.4 | 0.0 | 79 | 14 | 20 | 10 |
| % metal in elutriant | 17 | 0.0 | 0.0 | 99 | 100 | 92.8 | 98.6 | 100 | 20.5 | 86 | 80 | 90 |

Non-precious metals extracted along with Pt, Pd and Rh can be reduced readily by eluting the resin with 1N HCl at ambient temperature. In 4 bed volumes, substantial amounts of non-precious metals are eluted, Pd and Rh are not eluted and only a small amount of Pt is eluted (Table 5).

TABLE 5

Milligrams of metal eluted from automotive catalyst solution on WP-2 with 1 N HCl at ambient temperature.

| Bed volumes | Pt | Pd | Rh | Ce | La | Fe | Ni | Cr | Cu | Pb | Zn | Co |
|---|---|---|---|---|---|---|---|---|---|---|---|---|
| 1 | 0.48 | 0.00 | 0.00 | 6.68 | 0.44 | 12.99 | 1.78 | 0.21 | 2.73 | 3.30 | 5.27 | 0.02 |
| 2 | 0.45 | 0.00 | 0.00 | 0.08 | 0.00 | 0.56 | 0.17 | 0.01 | 0.08 | 2.64 | 0.44 | 0.00 |
| 3 | 0.40 | 0.00 | 0.00 | 0.05 | 0.00 | 0.16 | 0.06 | 0.01 | 0.02 | 1.56 | 0.06 | 0.00 |
| 4 | 0.54 | 0.00 | 0.00 | 0.13 | 0.00 | 0.06 | 0.03 | 0.00 | 0.01 | 0.90 | 0.02 | 0.00 |

Pt, Pd and Rh were then recovered from the resin by soxhlet extraction with 6N HCl for 12 hours. Analysis of the HCl indicated recovery of all of the Pt, Pd and Rh as well as very small amounts of residual non-precious metals (Table 6). Non-precious metals have been reduced to such a low concentration that their presence is not an impediment to PGMRA refining.

TABLE 6

Milligrams of metal in 6 N HCl after 12 hours of soxhlet extraction of WP-2 resin.

| Pt | Pd | Rh | Ce | La | Fe | Ni | Cr | Cu | Pb | Zn | Co |
|---|---|---|---|---|---|---|---|---|---|---|---|
| 26.0 | 4.98 | 0.78 | 0.03 | 0.00 | 0.21 | 0.09 | 0.18 | 0.06 | 0.00 | 0.12 | 0.01 |

Separation of PGMRA

PGMRA may be separated from one another or separated into groups with limited elemental compositions by varying acid concentration, acid composition, temperature and recovery procedures. Examples are representative and are not limiting in the scope of possible separations.

PGMRA separation is possible because the binding strength of individual PGMRA vary sufficiently in hydrochloric acid. Pt and Au can be readily separated from one another and the other PGMR elements by elution. As previously described (FIG. 2), the binding constant for Pt on WP-1 is relatively weak and Pt may be eluted by 0.1-1N HCl. Au may be eluted with 3-4N HCl. More tightly bound elements may also be separated. For example Pd has been separated from Rh, the most strongly bound PGMRA, with 12N HCl. The relatively high stripping rate of Ir and Ru (Table 2) suggest that they may also be separable from Rh and possibly from Os which has a very low stripping rate in 12N HCl. PGM retained on the polyamine composite resin are readily recovered by elution with concentrated HBr or by soxhlet or similar extraction methods.

Soxhlet or similar recovery methods are advantageously employed for PGM separation and for recovery of tightly bound PGM retained on the polyamine composite resin following recovery of other PGMRA. The method is exceptional when the binding constants for the elements are substantially different. Pt, one of the least tightly bound and Rh, the most tightly bound are readily separated. In one experiment, a solution containing Pt and Rh were loaded onto WP-1 resin (WP-2 is equally effective). Forty ml of the loaded resin were placed on top of an additional 40 ml of fresh resin with no PGM elements. The resin was soxhlet extracted for 6 hours with 6N HCl at 109° C. Less tightly bound Pt was eluted from the loaded resin and the fresh resin below. The elutriant contained much of the Pt and very little Rh. The elutriant was then replaced with fresh 6NHCl and soxhlet extracted for 15 hrs. The second solution contained 99 weight % of the Rh with a purity of 97.6% (Table 7). Recovery was quantitative as Pt and Rh were not detectable on the resin following extraction. Rh purity was increased to 99.7% by loading the second elutriant onto polyamine composite resin and repeating the soxhlet extraction procedure. Pt purity can also be improved substantially by a second soxhlet extraction of the first elutriant from fresh polyamine composite resin.

TABLE 7

Separation of Pt and Rh by soxhlet extraction with 6 N HCl at 109° C.

| | mg Pt | mg Rh | % Rh purity |
|---|---|---|---|
| First 6 hr extraction | 11.18 | 1.8 | |
| Second 15 hr extraction | 4.60 | 184. | 97.6 |

Separation results presented herein are exemplary of methods that may be used to separate PGMRA. Acid concentration, acid composition, temperature, pressure and apparatus may be varied to accomplish specific separations or improve the degree of separation between PGMRA.

A process with two variants, process 1 and process 2 may be advantageously employed to separate Rh from other PGMRA and non-precious metals. Purification of Rh is the most challenging problem in precious metal refining using known technologies. Techniques are tedious, time-consuming and require repeated treatments to achieve acceptable Rh recovery and purity. The two process variants described below utilizing polyamine composite resin and Unique chemical properties of Rh allow for rapid recovery of Rh with extremely high purity.

Dissolution of Rh in hydrochloric acid typically results in aquorhodate cations such as $Rh(H_2O)_6^{+3}$. The kinetics of the reaction to form the hexachlororhodate complex $RhCl_6^{-3}$ is relatively slow, typically taking several days or more at ambient temperature. The other PGMRA are believed to rapidly form chloro complexes in a matter of minutes. PGMRA and non-precious metals can be precipitated as insoluble hydroxides by adjusting solutions to pH8-10 or to soluble hydroxide complexes by adjusting to pH10-12 with a suitable base such as NaOH. Re-acidifying the solutions or precipitates with HCl results in formation of Rh aquochlororhodate and aquorhodate complexes while the other metals form chloro complexes When fresh solutions containing Rh and other PGMRA are loaded onto polyamine resin, aquorhodate cations in which several waters replace all or many of the chloride ligands are not bound to polyamine composite resin. The other PGMRA are bound to the resin. Rh in the elutriant is thus isolated from other PGMRA, a significant separation for preparation of high purity Rh products.

Process 1 as schematically shown in FIG. 8 is similar in many aspects to the process for dissolution, extraction and recovery of PGMRA metals as schematically shown in FIG. 1. In process 1, Rh-bearing source material is dissolved, preferably with HCl sparged with an oxidant, step 50. The acidic solution is exposed to polyamine composite resin, step 54, which binds PGMRA to the resin. Non-precious metals are not bound to the resin and are eluted. The resin is washed with dilute halogen acid such as 0.001-1N HCl, step 58, to remove remaining non-precious metals. PGMRA including Rh is stripped from the resin with 6 N HCl by soxhlet extraction or similar method including repeated contact of acidic stripping solution with the pregnant resin, step 60. The pregnant solution is adjusted to pH 8-10 with NaOH or other suitable base, step 64, to form insoluble hydroxide precipitates or to pH 10-12 to form soluble hydroxide complexes. The basic solution is then adjusted to 0.1-0.5N HCl by addition of concentrated HCl, step 64. The solution is exposed to polyamine composite resin within 24 hours of re-acidification, step 68. PGMRA with exception of Rh are in the form of chloro complexes that are bound to the resin. Rh does not bind to the resin and is eluted. Rh is then recovered from solution, step 70, by known methods. Other PGMRA metals bound to the resin may be recovered by a process schematically shown in FIG. 1.

Process 1 is preferable for complex, solid source materials such as automotive catalyst that contain multiple PGMRA as well as non-precious base, transition and rare-earth elements. Typically, the liquor from catalyst dissolution is sufficiently old (several days or more) that the aquo- and aquochlororhodate complexes have reverted to more stable hexachlororhodate complexes. Exposure of the liquor to polyamine composite resin extracts Pt, Pd and Rh as a group whereas non-precious metals are eluted. Rh is subsequently separated from Pt and Pd by converting the hexachlororodate complex back into aquorhodate complexes as described in the following example.

In one experiment, Pt, Pd and Rh derived from automotive catalyst were recovered from loaded or pregnant resin by elution with 6N HCl at 109° C. in a soxhlet extractor. The resulting solution was adjusted to about pH 8 with NaOH. Pt, Pd, Rh as well as the remaining trace amounts of base metals and transition elements were precipitated as insoluble hydroxides. The solids were filtered from solution and then redissolved in sufficient 12N HCl to bring the resulting solution to about 0.1-0.5N HCl. The resulting solution was exposed to polyamine composite resin within 24 hours. Pt and Pd which rapidly formed chloro complexes as well as most of the remaining non-precious metals were extracted by polyamine-composite resin. Rh in the form of aquorhodate complexes was not bound to the resin and remained in the elutriant. Rh was precipitated from the elutriant by addition of ammonium chloride and calcined to yield high purity rhodium metal; however, Rh could have been recovered by other methods known to those skilled in the art. In two trials, Rh purity of 98.8% and 99.7 was achieved with only a single extraction and elution (Table 8). If higher purity is required, the process may be repeated prior to precipitating with ammonium chloride. Although, the automotive liquor contained only Pt and Pd as other PGM elements, clearly, any other PGM element can be separated from Rh by this process.

TABLE 8

Purification of Rh via $Rh(H_2O)_6^{+3}$

| Metal | Trial 1 | Trial 2 |
| --- | --- | --- |
| Pt, mg recovered | 0.30 | 0.10 |
| Rh, mg recovered | 25.00 | 28.56 |
| Rh purity, % | 98.8 | 99.7 |

This specific automotive catalyst liquor had insufficient Pd to warrant recovery from the polyamine composite resin. Rather, the resin was used in subsequent extractions of automotive catalyst liquor until Pd concentrations were sufficiently high to warrant recovery by soxhlet extractor or similar device. Other liquors could result in both Pt and Pd on the resin that can be isolated as the hexachloro complexes in typically in hydrochloric acid solution. This solution is substantially free from other elements and is an excellent material for separation and purification by elution with acids of different stripping capacity, soxhlet extraction or current standard techniques of the precious metal industry such as solvent extraction.

A variant of the Rh process schematically shown in FIG. 9, process 2, is preferably employed for Rh in acidic solution which may be characterized by low concentrations of other PGMRA, acids other than hydrochloric or low Rh concentrations. The acidic solution is adjusted to pH 8-10 with NaOH or suitable base, resulting in precipitation of Rh, other PGMRA and non-precious metals, step 84. The precipitate is filtered from solution and then re-acidified to 0.1-0.5N HCl, step 84. The solution is exposed within 24 hours to polyamine composite resin, step 88. Rh and non-precious metals are not bound to the resin and are eluted whereas other PGMRA are bound to the resin. The elutriant solution is adjusted with concentrated HCl to 6N and refluxed for about 24 hours, step 90, to convert Rh to hexachlororhodate complexes. The solution is exposed to polyamine composite resin to extract Rh, step 94. The resin is washed with dilute HCl solution, step 96, to elute remaining base and other non-precious metals. Rh is stripped from the resin by soxhlet extraction, step 98, and recovered by known processes, step 100.

In an example of process 2, the Rh source material was a sulfuric acid-based plating solution acidic solution containing 2020 ppm Rh, 2 ppm Pd, about 3000 ppm Fe and an undetermined amount of other non-precious elements. 500 ml of solution was adjusted to pH8 with NaOH and insoluble hydroxides were filtered from the solution. The hydroxides were dissolved in 12N HCl to bring the resulting solution to about 0.1N. The solution was loaded less than 24 hours after re-acidification onto polyamine composite resin that was in about a 10-fold excess of that necessary for the contained Rh and Pd. Pd and a substantial amount of the contaminating elements were bound to the polyamine composite resin, whereas the elutriant contained Rh and the balance of contaminating elements.

The Rh solution was adjusted to 6N HCl and then refluxed at 109° C. for about 24 hours. The aquorhodate complexes were converted to hexachlororhodate complexes. This solution was then loaded onto polyamine composite resin which quantitatively extracted Rh. The resin was washed with dilute barren HCl of about 0.1-1N which removed a majority of the remaining contaminating elements, most of which was Fe. We believe that the majority of Fe was removed because the dilute acid broke down $FeCl_4^{-1}$ complexes that bound Fe to the resin. Rh was recovered subsequently from the resin by soxhlet extraction and ammoniacal precipitation. Rh recovery was slightly more than 99% and the purity exceeded 99%.

PGMRA Recovery in Circulating Systems

Numerous single-pass experiments chiefly using resin columns have demonstrated that PGMRA may be extracted from acidic solutions by polyamine composite resin. More significantly, the experiments have demonstrated that PGMRA subsequently can be stripped from the resin by eluting with acid. Individual or groups of PGMRA can be selectively stripped and separated from one another or contaminating elements by varying acid composition, acid concentration, temperature, stripping protocols and apparatus.

The processes described are readily adapted to recirculating systems in which relatively smaller volume solutions pass through the polyamine composite resin multiple times. Repeated contact over time of solution with source material and polyamine composite resin is a distinct advantage because PGMRA with exception of stripped from possibly Os, the two most tightly bound elements, have been successively slow extraction from polyamine composite resin at ambient temperature in spite of sparing stripping rates. Repeated contact over time is also distinct advantage for kinetically slow extraction or recovery processes. Furthermore, the relatively small volume is a distinct advantage in concentrating PGMRA for recovery. The relatively small volume can be a disadvantage at the same time because equilibrium concentrations are more rapidly achieved. Proper management of product concentrations in recirculating systems as described below overcomes this disadvantage.

A schematic diagram of a recirculating system is shown in FIG. 5. PGMRA source materials are loaded into a non-reactive dissolution tank along with HCl of appropriate concentration. The solution is sparged with $Cl_2$ and pumped upwards through the source material out of the top of the tank and then returned through the pump to the bottom of the tank. During PGMRA dissolution, the dissolution tank is not connected to the resin tank. As necessary, the dissolution tank may be heated or pressurized to accelerate PGMRA dissolution. PGMRA dissolution continues until all PGMRA are dissolved or PGMRA concentrations achieve equilibrium concentrations.

At such time, the dissolution tank is connected to a second tank containing polyamine composite resin as shown in the left panel of FIG. 5. The solution is pumped upwards through the resin, returned to the base of the dissolution tank where it passes upwards and then returns to the pump at the base of the polyamine composite resin tank. The pump rate is adjusted to slightly fluidize the resin, thus assuring intimate contact of PGMRA-bearing solutions with resin. PGMRA are strongly partitioned onto the polyamine composite resin because of the strong binding strength of PGMRA to resin. That is, the resin is a sink for PGMRA, thus preventing establishment of PGMRA concentrations in equilibrium with the source materials. The solution is allowed to circulate until PGMRA are completely extracted from solution or achieve equilibrium concentrations. If equilibrium PGMRA concentrations are higher than desired, the solution may be passed through fresh resin to extract additional PGMRA.

At the conclusion of PGMRA extraction onto the resin, the resin tank is disconnected from the dissolution tank and connected with a third tank. Acid elution of PGMRA from polyamine composite resin as demonstrated by experiments with resin columns herein is difficult because of the high binding strength of PGMRA to the resin. The amount stripped per volume of acid is relatively low, particularly for elements such as Pd that is strongly bound to the polyamine composite resin. A recirculating system operating over time can partially compensate for relatively low amounts stripped per volume. With proper management of PGMRA concentrations in the elutriant recycled over the resin, the concentration ratio of hydrogen ion to PGMRA ion or complex will remain high and favor stripping of PGMRA from the resin.

Stripping PGMRA from polyamine composite resin is advantageously combined with solvent extraction for two principal reasons. As demonstrated in column elution experiments, individual or groups of PGMRA can be selectively stripped by variation of acid concentration, acid composition and temperature. These variables can be varied, within limits dependent on the specific solvent extractant, independently, thus achieving some degree of PGMRA separation during stripping. Non-precious base metal, transition element and rare earth elements also can be selectively stripped prior to PGMRA stripping to improve PGMRA product purity.

Solvent extractants can also be varied independently to suit the particular precious metals on the polyamine composite resin. An extensive literature exists for solvents comprising such compounds as di-butyl carbitol, di-n-octyl sulfide, tri-n-butyl phosphate and tri-n-octyl amine. Of the 8 PGMRA effectively extracted by polyamine composite resins, suitable element-specific solvents are known for all but Rh. Solvents are variously used individually or in sequence to extract selected elements or groups of elements. PGMRA are subsequently stripped from the solvent by known methods.

The principal benefit of solvent extractants is that PGMRA are very strongly fractionated into the solvent and the solvent thus acts as a sink for PGMRA stripped from resin. As PGMRA-bearing acid sinks downward through the lower density solvent, PGMRA is extracted from the solution, thus generating an essentially barren acid. When the acidic solution is returned to the tank with pregnant or loaded polyamine composite resin, the resin is bathed in a solution with a high concentration ratio of hydrogen ion to PGMRA complex ion that readily displaces more PGMRA from the resin. In a recirculating system such as schematically shown in the middle panel of FIG. 5, the pregnant resin is stripped nearly continuously with barren or nearly barren acid.

The kinetic rate of PGMRA extraction by organic solvents is relatively slow. For example as shown in FIG. 7, Pd concentrations increase rapidly for the first 24 hours and then slowly over the next tens of hours. Maximum concentrations are achieved only after more than 80 hours of extraction by di-n-butyl sulfide (DOS). In a typical extraction, Pd is extracted for about 24 hours until the extraction rate drops off very precipitously. The partially loaded DOS is removed and replaced with fresh. The remaining Pd in solution is then extracted more rapidly by fresh DOS than it would have been by extending the first extraction for 80 hours or more.

Stripping polyamine composite resins with solvent extraction provides many benefits. The process is usually effective at ambient temperature even for PGMRA that have low stripping rates from resin. Stripped polyamine composite resin is unaffected by solvent extraction and is suitable for reuse. If the resin retains a low equilibrium concentration of PGMRA following solvent extraction, this background concentration will allow quantitative extraction of PGMRA in a subsequent extraction of the resin loaded with PGMRA from subsequent dissolution and loading. And finally, the acid solution can be recycled.

As shown schematically in the right panel of FIG. 5, the final stage is one in which PGMRA-loaded solvent is transferred from the solvent extraction tank into a fourth tank. PGMRA are then recovered from the solvent by methods widely known in the precious metals industry.

In one experiment, 12,000 lb of alumina-based catalyst with 0.050 weight % (500 ppm) Pd was placed in a tank with 110 gallons of concentrated (about 10N) hydrochloric acid and sufficient water to cover the alumina based catalyst. The contents were sparged with about 1,000 ppm $Cl_2$. The solution was circulated for about 2 days at which time Pd concentrations in solution reached equilibrium values and dissolution was deemed complete. The dissolution tank was then connected to a second tank containing WP-1 polyamine composite resin in an amount barely sufficient to recover the Pd in solution. The solution was circulated as indicated schematically in the left panel of FIG. 5 for about 2 days. The resin was fully loaded in the two days; however, about 70 ppm Pd remained in solution. The solution was drained from the resin and exposed to fresh polyamine composite resin in a subsequent extraction. The low concentration of Pd in this solution necessitated about 8 days to recover the Pd and achieve a final equilibrium concentration of about 6 ppm (FIG. 6).

The loaded or pregnant polyamine composite resin was immersed in concentrated hydrochloric acid and the tank was connected to a third tank containing concentrated hydrochloric acid and di-n-octyl sulfide as schematically shown in the middle panel of FIG. 5. As the solution was pumped through the tank with pregnant resin, concentrated hydrochloric acid stripped Pd from the pregnant resin and the Pd was subsequently stripped by the di-n-octyl sulfide as the concentrated pregnant acid descended through the organic liquid. After two days of circulation, Pd was stripped from the resin.

Pd was eventually recovered from the di-n-octyl sulfide by known methods. Final recovery of Pd was 98.22% of the amount on the catalyst and the purity was 99.99% Pd.

Thus, processing for the recovery of platinum group metals, rhenium and gold from source materials is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A method for the separation of dissolved Rh from other dissolved PGMRA metals, comprising
    converting at least one dissolved PGMRA metals selected from the group consisting of Pt, Pd, Ir, Os, Ru, Re and Au in an acidic aqueous solution to hydroxides by adjusting the acid to pH 8-12, the acidic aqueous solution also containing dissolved Rh;
    reacidifying the basic solution to 0.1-0.5N HCl including dissolving the PGMRA metal hydroxides;
    binding the dissolved at least one PGMRA metal selected from the group consisting of Pt, Pd, Ir, Os, Ru, Re and Au in an acidic aqueous solution to extraction material of non-cross linked polyamine composite resin on a substrate including exposing the dissolved at least one PGMRA metal to the extraction material, the dissolved Rh remaining unbound from the extraction material;
    eluting the dissolved Rh from the extraction material with at least one eluting acid.

2. The method of claim 1, converting PGMRA to hydroxides including adding NaOH to the acidic aqueous solution.

3. The method of claim 1, exposing the reacidified solution being within twenty-four hours of the reacidification.

4. The method of claim 1 further comprising
    the dissolved Rh remaining unbound being aquorhodate and aquochlororhodate complexes, converting the eluted aquorhodate and aquochlororhodate complexes to hexachlororhodate complexes in the reacidified solution;
    extracting Rh by exposing the converted solution to non-cross-linked polyamine composite resin;
    eluting the extracted Rh from the extraction material.

5. The method of claim 1, eluting further including soxhlet extraction.

6. A method for the separation of dissolved Rh from other dissolved PGMRA metals, comprising
    converting a plurality of dissolved PGMRA metals selected from the group consisting of Pt, Pd, Ir, Os, Ru, Re and Au in an acidic aqueous solution to hydroxides by adjusting the acid to pH 8-12, the acidic aqueous solution also containing dissolved Rh;
    reacidifying the basic solution to 0.1-0.5N HCl including dissolving the PGMRA metal hydroxides;
    binding the plurality of dissolved PGMRA metal selected from the group consisting of Pt, Pd, Ir, Os, Ru, Re and Au in an acidic aqueous solution to extraction material of non-cross linked polyamine composite resin on a substrate including exposing the plurality of dissolved PGMRA metal to the extraction material, the dissolved Rh remaining unbound from the extraction material;
    eluting the dissolved Rh from the extraction material with at least one eluting acid;
    eluting the bound PGMRA metal from the extraction material with at least one eluting acid, including sequentially eluting with eluting acids of increasing specific stripping capacity to separately elute individual elements of the bound PGMRA.

* * * * *